US009465171B2

(12) United States Patent
Grinderslev

(10) Patent No.: US 9,465,171 B2
(45) Date of Patent: Oct. 11, 2016

(54) SHORT OPTICAL TERMINUS

(71) Applicant: Tyco Electronics Corporation, Berwyn, PA (US)

(72) Inventor: Soren Grinderslev, Hummelstown, PA (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 0 days.

(21) Appl. No.: 14/573,520

(22) Filed: Dec. 17, 2014

(65) Prior Publication Data
US 2015/0355418 A1 Dec. 10, 2015

Related U.S. Application Data

(60) Provisional application No. 62/010,218, filed on Jun. 10, 2014.

(51) Int. Cl.
*G02B 6/38* (2006.01)
*G02B 6/32* (2006.01)

(52) U.S. Cl.
CPC .......... *G02B 6/3874* (2013.01); *G02B 6/3869* (2013.01); *G02B 6/3878* (2013.01); *G02B 6/3893* (2013.01); *G02B 6/32* (2013.01); *G02B 6/3817* (2013.01)

(58) Field of Classification Search
None
See application file for complete search history.

(56) References Cited

U.S. PATENT DOCUMENTS

| 7,343,068 | B2 * | 3/2008 | Shigenaga | G02B 6/32 385/33 |
| 7,775,725 | B2 | 8/2010 | Grinderslev | |
| 9,195,008 | B2 * | 11/2015 | Farnan | G02B 6/3875 |
| 2010/0027943 | A1 | 2/2010 | Armani et al. | |
| 2010/0104244 | A1 * | 4/2010 | Grinderslev | G02B 6/3874 385/74 |
| 2013/0039622 | A1 | 2/2013 | Grinderslev | |
| 2015/0355418 | A1 * | 12/2015 | Grinderslev | G02B 6/3893 385/61 |

OTHER PUBLICATIONS

European Search Report, Mail Date, Nov. 4, 2015, EP 15 17 0218, Application No. 15170218.0-1553.

* cited by examiner

*Primary Examiner* — Rhonda Peace

(57) ABSTRACT

An optical connector comprising a plug housing having a pin cavity; a pin having a front and rear orientation and disposed at least partially in the pin cavity, the pin comprising at least a pin sleeve having a pin sleeve length, the pin sleeve at least partially containing a pin ferrule and a pin lens; a receptacle housing having a socket cavity; a socket having a front and rear orientation and disposed at least partially in the socket cavity, the socket comprising at least a socket sleeve having a socket sleeve length, the socket sleeve at least partially containing a socket ferrule and a socket lens; and an alignment sleeve between the pin and socket, wherein, when in a mated state, a pin front portion of the pin sleeve and a socket front portion of the socket sleeve are disposed in the alignment sleeve, wherein the pin front portion and the socket front portion are at least ⅓ the length of the pin sleeve and socket sleeve, respectively.

14 Claims, 4 Drawing Sheets

SHORT OPTICAL TERMINUS

CROSS REFERENCE TO RELATED APPLICATIONS

This application claims priority to U.S. Provisional Application No. 62/010,218 filed Jun. 10, 2014, the entire disclosure of which is hereby incorporated herein by reference.

FIELD OF INVENTION

The present invention relates generally to ruggedized optical termini, and, more specifically, to termini applicable to ruggedized optical connectors having a shortened length.

BACKGROUND OF INVENTION

Optical fiber connectors are a critical part of essentially all optical fiber communication systems. For instance, such connectors are used to join segments of fiber into longer lengths, to connect fiber to active devices, such as radiation sources, detectors and repeaters, and to connect fiber to passive devices, such as switches, multiplexers, and attenuators. The principal function of an optical fiber connector is to hold the fiber end such that the fiber's core is axially aligned with an optical pathway of the mating structure. This way, light from the fiber is optically coupled to the optical pathway.

Of particular interest herein, are multi-cavity connectors. Such connectors typically comprise an outer housing defining a plurality of cavities for holding inner assemblies or "inserts," or, more specifically pin inserts and socket inserts for receiving pin or socket termini. (See, e.g., U.S. Pat. Nos. 7,775,725, and 8,827,567 incorporated herein by reference.) Over the years, multi-cavity connectors have evolved into a ruggedized connector system, comprising an outer housing, which is configured to mate with the outer housing of a mating connector, typically through a screw connection. Numerous United States Military specifications describe such multi-cavity connectors and fiber optic terminals, including, for example, MIL-C-38999, MIL-C-5015 and ARINC600 among others.

Many of these multi-cavity connectors use the same or similar sized termini. For example, the current TE size 16 expanded beam (EB) termini are designed with a similar dimensional envelope as that of the well-known fiber optic physical contacts: MIL-29504/4D/5D. This means that the size 16 expanded beam design will fit into the same cavity and can be inserted and removed with the same tools. However, for shorter connectors, such as the European modular rectangular EN4644 connector and the EN4165, which is commonly used for seat-to-seat electrical signal connections in commercial aircraft, the spring-loaded size 16 socket terminus is too long and does not fit into the connector half.

Therefore, applicants have identified the need for a terminus that is shorter than traditional optical terminus and can be used in existing shorter connectors, such as the European EN4165 and EN4644 connectors. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

In one embodiment, the present invention relates to an optical connector comprising: (a) a plug housing having a pin cavity; (b) a pin having a front and rear orientation and disposed at least partially in said pin cavity, the pin comprising at least a pin sleeve having a pin sleeve length, the pin sleeve at least partially containing a pin ferrule and a pin lens; (c) a receptacle housing having a socket cavity; (d) a socket having a front and rear orientation and disposed at least partially in the socket cavity, the socket comprising at least a socket sleeve having a socket sleeve length, the socket sleeve at least partially containing a socket ferrule and a socket lens; (e) an alignment sleeve between the pin and socket, wherein a pin front portion of the pin sleeve and a socket front portion of the socket sleeve are disposed in the alignment sleeve, wherein the pin front portion and the socket portion are at least ⅓ the length of the pin sleeve and socket sleeve, respectively. In one embodiment, the socket does not have a spring to bias it in the housing and is about the same size as the pin.

BRIEF DESCRIPTION OF DRAWINGS

FIGS. 5a and 5b shows one embodiment of the connector of the present invention with a shortened socket and increased wipe distance at the minimum and maximum CTC distances, respectively.

DETAILED DESCRIPTION

Figure 1:
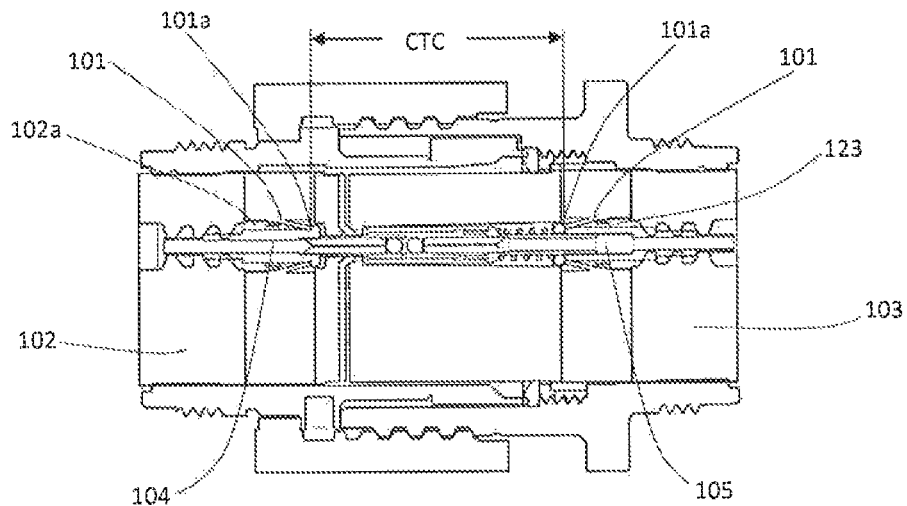
FIG. 1 illustrates the Clip-to-Clip (CTC) distance (per the MIL-C-38999 standard) between the tips of the tines on two mated connector halves.
Figure 5A:
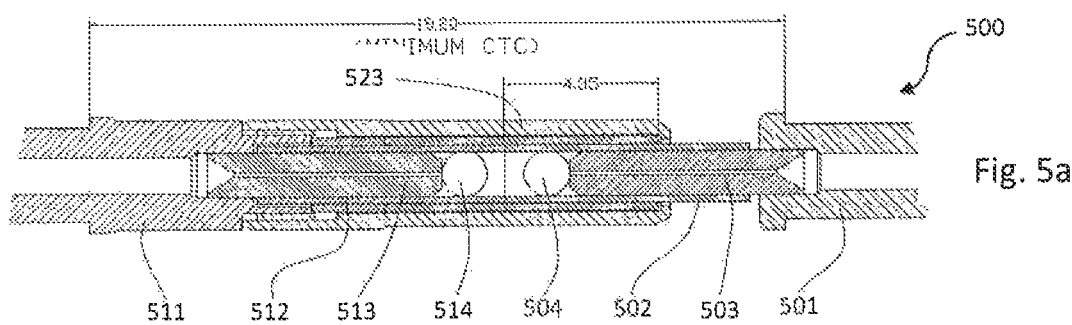
Figure 5A:
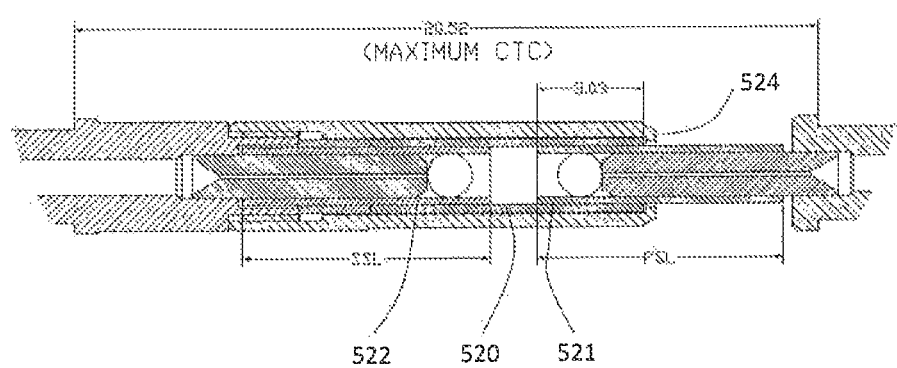

Referring to FIGS. 5a and 5b, one embodiment of the connector system 500 of the present invention is shown. The connector system 500 comprises a plug housing 102 having a pin cavity 102a (see FIG. 1). At least partially disposed in the cavity 102a is a pin 501 (see FIGS. 5a and 5b) having a front and rear. The pin 501 comprises at least a pin sleeve 502 having a pin sleeve length (PSL). The pin sleeve 502 at least partially contains a pin ferrule 503 and a pin lens 504. In one embodiment, the connector system 500 also comprises a receptacle housing 103, having a socket cavity 103a (as shown in FIG. 1). At least partially deposed in the socket cavity 103 is a socket 511 having a front and rear orientation. The socket 511 comprises at least a socket sleeve 512 having a socket sleeve length (SSL). The socket sleeve at least partially contains a socket ferrule 513 and a socket lens 514. An alignment sleeve 520 is positioned between the pin and socket and retained within the socket shroud 523, wherein a pin front portion 521 of the pin sleeve and a socket front portion 522 of the socket sleeve are disposed in the alignment sleeve 520. In one embodiment, the pin front portion and the socket portion are at least ⅓ the length of the pin sleeve and socket sleeve, respectively.

In the MIL-29504/4D/5D standard configuration and the commercially-available product, the alignment sleeve 520 is mounted over the socket ferrule, but is not retained by the shroud. Consequently, sometimes the mating sleeve stays on the pin side at connector separation. This is problematic as the sleeve is easily broken when attempting to remove it from the pin and place it back onto the socket ferrule. In one embodiment of the termini of the present invention, a retaining mechanism—e.g., a shoulder 524—is defined at the end of the shroud to retain the sleeve 520.

Figure 2:
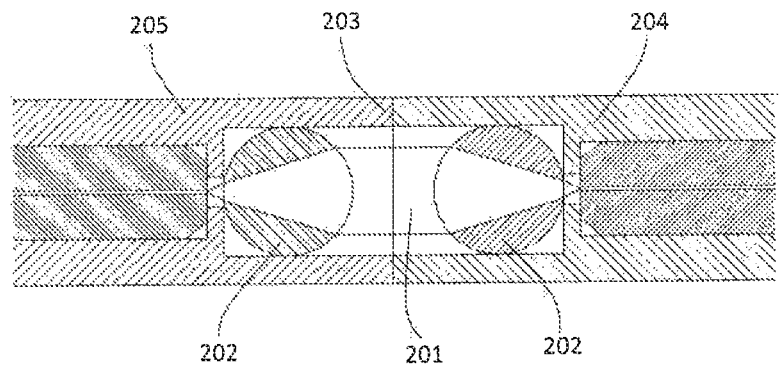
FIG. 2 shows schematically the concept of beam expansion.

One aspect of the present invention is the recognition that a shortened terminus connector can be realized if (1) the spring that biases the terminus in the housing is eliminated, (2) the optical coupling is effected through an expanded beam, and (3) the optical coupling is near the midpoint of the alignment sleeve. More specifically, the spring occupies significant space relatively speaking, and its removal enables the length of the socket terminus to be reduced significantly. However, the spring is typically required to ensure physical contact. For example, the optical socket terminus conforming to the MIL-29504/5D standard provides physical contact (PC) between the fibers of the mated pin and socket. These termini are typically used in a 38999 series III style connector and have been around for over 20 years. An expanded beam connector, however, avoids the need for PC. The design for individual expanded beam termini is described for example in issued U.S. Pat. No. 7,775,725 and U.S. Pat. No. 8,827,567. The concept of beam expansion is illustrated in FIG. 2. This design takes advantage of non-contacting optics 202 (e.g., ball lenses) at the interface 203 of two connectors 204, 205 and the creation of a collimated expanded beam (EB) 201 that is transmitted across the interface 203.

This design has significant advantages. For example, due to the non-contact design, no noticeable degradation occurs at the EB optical interfaces. This means that while the PC version will begin its performance degradation from essentially the time it has been polished and left the factory, the non-contact EB design does not experience any optical signal degradation during its lifetime. Furthermore, due to the beam expansion, the presence of dust particles in the EB environment has a much lesser effect on performance than it has for the PC environment with the result that the EB design is increasingly becoming the preferred optical terminus to use in harsh environments.

Additionally, because the beam 201 is collimated, it is tolerant of axial variations between the connectors compared to PC termini, and, thus, obviates the need for a spring to register the termini to ensure precise axial positioning between termini. Conversely, the spring used in the MIL-29504/4D/5D and in the current size 16 EB design is needed to compensate for the large tolerance of the "clip-to-clip" distance of the mated connector. The clips (or retainers) are positioned in the plug half and in the receptacle half of the connectors. Their purpose is to retain the rear mounted termini in their respective connector halves. Once a terminus is being pushed into the cavity it will pass through the retainer and spread out its tines to the point when a terminus shoulder has passed the tines they will resiliently snap back in behind the shoulder and create a support that prevents the terminus from backing out.

Yet another advantage of the connector of the present invention is its low mating force requirements. Specifically, because the connector has no spring, no additional is required to compress the spring during mating, as is typically required for the spring loaded 29504 version, for example, or mating torque for circular connectors. This is particularly important for higher termini count in a given connector which can otherwise require significant force to compress the multitude of springs used in such connectors.

Referring to FIG. 1, a MIL-DTL-38999, series III, connector with mated size 16 expanded beam termini is shown. The pin 104 is mounted in the Plug connector half 102, and the spring-loaded socket 105 in disposed in the Receptacle connector half 103. The distance between the tips 101a of the tines 101 on two mated connector halves 102, 103, is referred to the Clip-to-Clip (CTC) distance, see FIG. 1. For the MIL-STD-38999, style III standard the CTC distance is listed in the dimensional specification. It has a rather large tolerance in that there is a difference between the minimum and maximum CTC of about 1.32 mm. This large tolerance is not an issue for the copper contacts for which the connector originally was designed, but is a very large distance for a pair of fiber optic termini, which typically require close proximity, if not contact, between the fibers. Thus, for the MIL-29504/4D/5D a spring was incorporated to compensate for this large CTC distance. Furthermore, the PC connection must have physical contact between the fibers at all times in order to sustain good optical signal transmission. A spring provides the resiliency necessary to force a physical fiber contact during every connector mating. Thus, the spring version of the socket is preloaded and the amount of added spring force applied during mating, created by the contact and forward travel by the pin terminus, depends on where the CTC falls within the maximum and minimum distance allowance.

On the other hand, when an expanded beam design is used, the spring force becomes somewhat irrelevant. Due to the parallel beam configuration created by the beam collimation between the emitting and receiving lenses, the distance between them theoretically has only a very small effect under perfect conditions. However, a beam is rarely perfectly collimated and a small loss change will be introduced over larger lens distances due to the diffraction angle of the collimated beam. In some cases a spring may be helpful in an EB connection during exposure to strong vibration. But generally, as indicated above, the EB performance for a well-executed design, will perform equally well with or without a resilient mating force.

Thus, the use of an EB coupling facilitates the elimination of the spring by providing the connector with the necessary axial tolerance to compensate for the tolerance in the CTC distance. The EB coupling also synergistically improves performance because the non-contact EB design does not experience any optical signal degradation during its lifetime.

Figure 3:
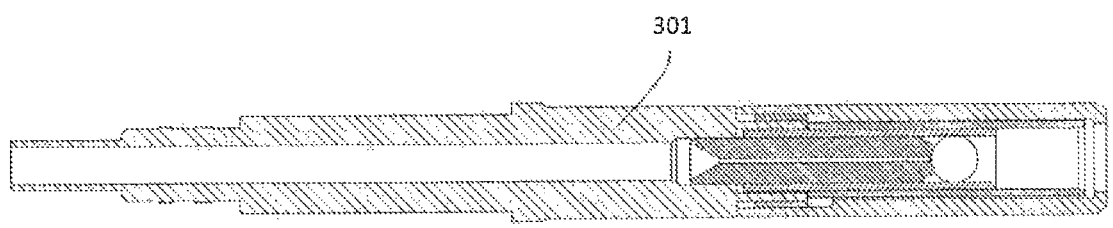
FIG. 3 shows an approach of a design for the size 16 EB socket in a MIL-29504 type connector without a spring.
Figure 4A:
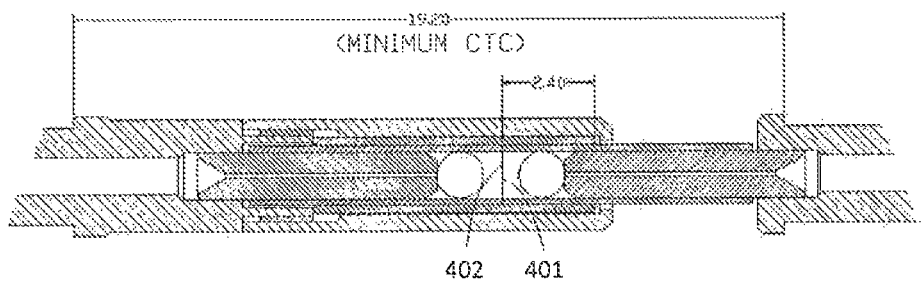
FIGS. 4a and 4b illustrate the problem with the connector springless termini in a MIL-29504 configuration incorporating the socket design of FIG. 3.
Figure 4B:
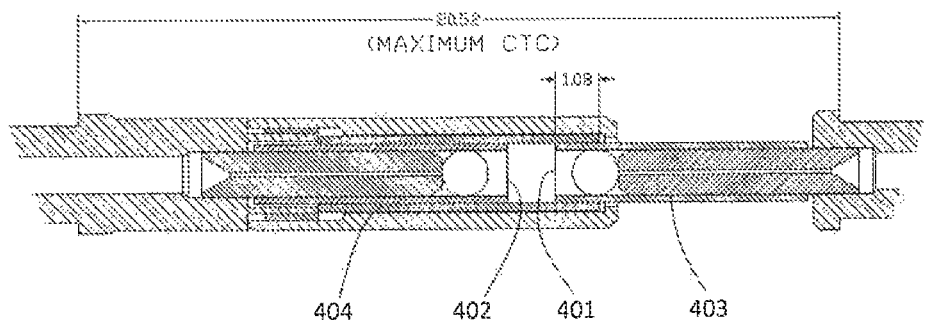

A springless design for the size 16 EB MIL-29504 terminus 301 is shown in FIG. 3. A problem with this design is illustrated in FIGS. 4a and 4b. For a springless version, it is necessary to design the closest distance between the pin tip 401 and the socket tip 402 to occur at the minimum standardized clip-to-clip distance of 19.20 mm as shown on FIG. 4a. In this configuration, the "wipe distance" or the distance that the pin 403 reaches within the alignment sleeve 404 is approximately 2.4 mm. This also equates to the wipe distance of the regular MIL-29504/4D/5D configuration. However, if the connector has the maximum allowed clip-to-clip distance as permitted by the Military standards, the wipe distance is now reduced to approximately 1.0 mm as demonstrated in FIG. 4b. Such a short wipe distance is insufficient to provide proper support and alignment during a harsh environment exposure.

The design for the springless socket of the present invention includes redesigned components and a shift back of the internal components in the socket terminus such that the mating interface between the pin and socket is positioned more towards the center of the mating or alignment sleeve. This increases the wipe distance of the pin during mating and provides sufficient structural support during exposure to a harsh mechanical environment. For example, in the embodiment of FIGS. 5a and 5b, the wipe distance is increased by nearly 300% at the maximum CTC distance (worst case).

In one embodiment, the wipe distance of the pin, or, in other terms, the pin front portion, ranges from about at least $\frac{1}{3}$ to over $\frac{1}{2}$ of the pin sleeve length. In one particular embodiment, the pin front portion is at least 40% of the pin sleeve length. In one embodiment, the pin and the socket are held in the plug and receptacle within a certain tolerance such that the relative distance between them ranges from a minimum distance to a maximum distance (e.g., a minimum and maximum CTC distance). In one embodiment, at the maximum distance, the pin front portion is at least $\frac{1}{3}$ of the pin sleeve length. More particularly, in one embodiment, the pin front portion ranges from about at least $\frac{1}{3}$ of the pin sleeve length at the maximum distance to over $\frac{1}{2}$ of the pin sleeve length at the minimum distance.

Figure 6:
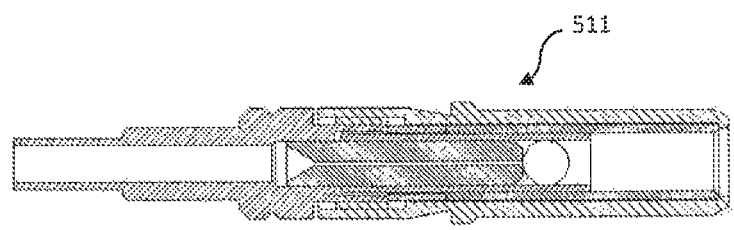
FIG. 6 shows the short, springless socket terminus position about midway in the alignment sleeve to provide the pin terminus with improved wipe distance.
Figure 7:
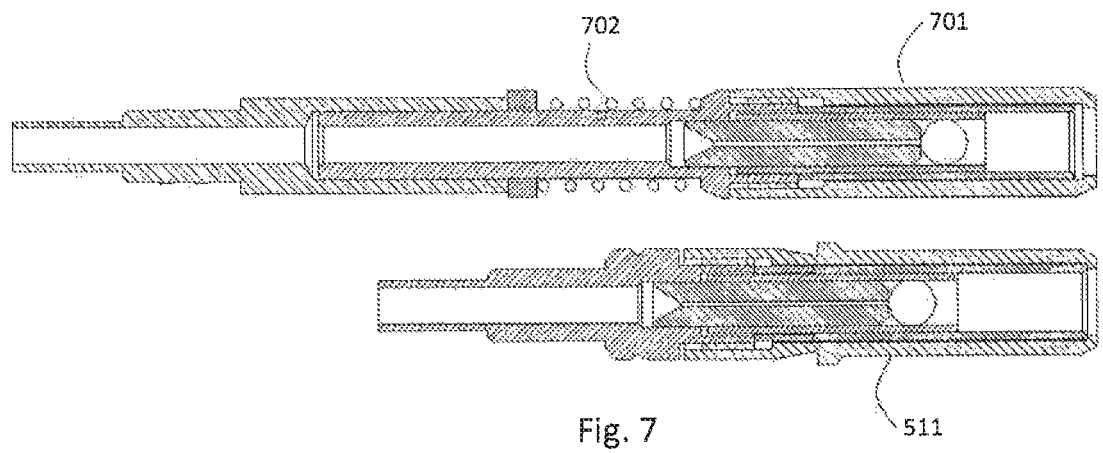
FIG. 7 shows a comparison between the size 16 EB MIL-2904/4D/5D socket spring version and the short, springless socket of FIG. 6 that fits into an EN4165 connector.
Figure 8:
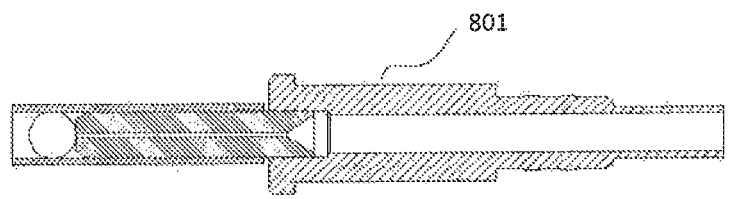
FIG. 8 shows a size 16 expanded beam pin terminus.

FIG. 6 shows one embodiment of the shortened, springless socket 511. FIG. 7 compares this socket 511, which fits into an EN4165, series 2 and EN4644 connectors, to a size 16 EB MIL-29504/4D/5D socket 701 which has a spring 702. The difference in length is significant. In one embodiment, the length of the socket 511 is about the same as the pin 801 as shown in FIG. 8. In one embodiment, the socket has a length of no greater than about 3 times the socket sleeve length. More particularly, in one embodiment, the socket has a length of no greater than about 2.5 times the socket sleeve length.

Figure 9:
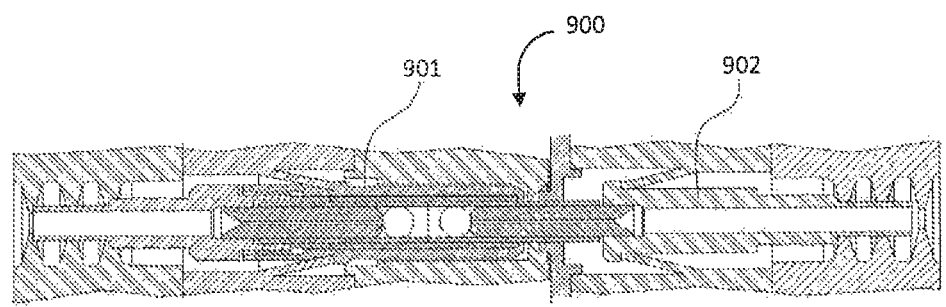
FIG. 9 shows a cross section of a mated pair of the EN4165 connector with the short, springless socket of FIG. 6 and the pin of FIG. 8.
Figure 10:
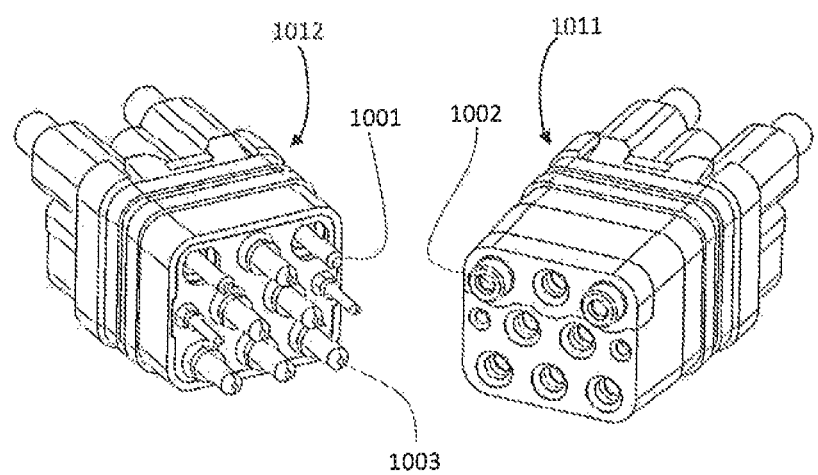
FIG. 10 shows the plug and receptacle of the EN4165 with a hybrid configuration of copper and fiber optic contacts and termini.

The shortened socket terminus and pin configuration of the present invention is suitable for implementation in a variety of different connector configurations. For example, referring to FIG. 8, a size 16 expanded beam pin terminus 801 is shown, which is used for all the connector types illustrated herein. FIG. 9 shows a cross section of a mated pair of the EN4165, series 2 connector 900, comprising the short, springless socket 901 and the pin 902. FIG. 10 shows the plug housing 1012 and receptacle housing 1011 of an EN4165, series 2 connector with a hybrid configuration of copper contacts 1003 and fiber pin and socket termini 1001, 1002, respectively.

It should be apparent from the above description that the insert configuration of the present invention provides significant advantages over conventional insert configurations such as high channel density and interchangeability with existing connector components. Still other advantages of the insert and ferrule of the present invention are anticipated.

What is claimed is:
1. An optical connector comprising:
  a plug housing having a pin cavity;
  a pin having a front and rear orientation and disposed at least partially in said pin cavity, said pin comprising at least a pin sleeve having a pin sleeve length, said pin sleeve at least partially containing a pin ferrule and a pin lens;
  a receptacle housing having a socket cavity;
  a socket having a front and rear orientation and disposed at least partially in said socket cavity, said socket comprising at least a socket sleeve having a socket sleeve length, said socket sleeve at least partially containing a socket ferrule and a socket lens; and
  an alignment sleeve between said pin and socket, wherein, when in a mated state, a pin front portion of said pin sleeve and a socket front portion of said socket sleeve are disposed in said alignment sleeve, wherein said pin front portion and said socket front portion are at least $\frac{1}{3}$ the length of said pin sleeve and socket sleeve, respectively, and
  wherein said pin and said socket are held in said plug and receptacle within a certain tolerance such that the relative distance between them ranges from a minimum distance to a maximum distance when in said mated state, wherein said pin front portion ranges from about at least $\frac{1}{3}$ of said pin sleeve length at said maximum distance to over $\frac{1}{2}$ of said pin sleeve length at said minimum distance.

2. The optical connector of claim 1, wherein neither said pin or said socket comprises a spring to urge said ferrule assembly forward.

3. The optical connector of claim 2, wherein said socket has a length of no greater than about 3 times the socket sleeve length.

4. The optical connector of claim 3, wherein said socket has a length of no greater than about 2.5 times the socket sleeve length.

5. The optical connector of claim 2, wherein said socket has a length of no greater than about the length of said pin.

6. The optical connector of claim 1, wherein said pin front portion ranges from about at least $\frac{1}{3}$ to over $\frac{1}{2}$ of said pin sleeve length.

7. The optical connector of claim 6, wherein said pin front portion is at least 40% of said pin sleeve length.

8. The optical connector of claim 1, wherein said alignment sleeve is connected to said socket.

9. The optical connector of claim 1, further comprising a shroud at least partially containing said alignment sleeve, wherein said shroud has at least one end comprising a shoulder to retain said alignment sleeve.

10. The optical connector of claim 1, further comprising:
  a first clip disposed between said plug housing and said pin in said pin cavity to position said pin axially in said plug housing;
  a second clip disposed between said receptacle housing and said socket in said socket cavity to position said socket axially in said receptacle housing; and
  wherein the clip-to-clip (CTC) distance between said first and second clips has a certain tolerance such that the CTC ranges from a minimum distance to a maximum distance.

11. The optical connector of claim 10, wherein said pin front portion ranges from about at least $\frac{1}{3}$ of said pin sleeve length at said maximum distance to over $\frac{1}{2}$ of said pin sleeve length at said minimum distance.

12. The optical connector of claim 11, wherein said connector is a MIL-29504-type connector.

13. The optical connector of claim 1, wherein said connector is a size 16 connector.

14. The optical connector of claim 13, wherein said connector is a EN4165 or a EN4644.

\* \* \* \* \*